(12) United States Patent
Watanabe

(10) Patent No.: US 6,657,818 B2
(45) Date of Patent: Dec. 2, 2003

(54) SHUTTER AND DISK CARTRIDGE HAVING THE SAME

(75) Inventor: Taku Watanabe, Miyagi (JP)

(73) Assignee: Sony Corporation, Tokyo (JP)

( * ) Notice: Subject to any disclaimer, the term of this patent is extended or adjusted under 35 U.S.C. 154(b) by 98 days.

(21) Appl. No.: 09/802,620

(22) Filed: Mar. 9, 2001

(65) Prior Publication Data

US 2001/0028534 A1 Oct. 11, 2001

(30) Foreign Application Priority Data

Mar. 13, 2000 (JP) .................................... P2000-068961

(51) Int. Cl.⁷ .............................................. G11B 23/03
(52) U.S. Cl. ...................................................... 360/133
(58) Field of Search ................................ 360/133, 132; 369/291

(56) References Cited

U.S. PATENT DOCUMENTS

| | | | |
|---|---|---|---|
| 5,226,035 A | 7/1993 | Kato et al. .................... | 369/291 |
| 5,739,993 A | 4/1998 | Kikuchi et al. .............. | 360/133 |
| 6,169,266 B1 * | 1/2001 | Hughes .................. | 219/121.68 |
| 6,245,397 B1 * | 6/2001 | Watanabe et al. ............ | 427/596 |
| 6,251,212 B1 * | 6/2001 | Moh et al. ................... | 156/268 |
| 6,277,228 B1 * | 8/2001 | Fabrikant et al. ............ | 156/209 |
| 2002/0051930 A1 * | 5/2002 | Ozawa et al. ............. | 430/270.1 |

FOREIGN PATENT DOCUMENTS

| | | | |
|---|---|---|---|
| DE | 3907263 | 9/1990 | ......... G11B/23/033 |
| EP | 0343844 | 11/1989 | .......... G11B/23/03 |
| EP | 0524824 | 1/1993 | .......... G11B/23/03 |
| EP | 0727783 | 8/1996 | .......... G11B/23/03 |
| WO | 9321632 | 10/1993 | .......... G11B/23/03 |

* cited by examiner

Primary Examiner—Carl Whitehead, Jr.
Assistant Examiner—Jennifer M Dolan
(74) Attorney, Agent, or Firm—Jay H. Maioli

(57) ABSTRACT

A slidable shutter, which is supported by a case body containing a recording medium that opens/closes an opening formed in the case body, and includes at least two layers composed of a base layer and at least one covering layer formed to cover the base layer. Within this shutter, there is a hue difference within a range of two or more in the hue cycle of the PCCS (Practical Color Coordinate System) between at least two uppermost layers of the shutter and the underlying layer thereof. Surface markings of the shutter are formed by cutting away regions, corresponding to the markings, from the surface portion of the shutter to a depth extending either to the bottom of the uppermost layer or to part of the underlying layer through the uppermost layer. In this way, the marking formation on the surface portion of this shutter will effectively reduce cost, improve workability, and enhance the visibility of the markings.

4 Claims, 3 Drawing Sheets

SHUTTER AND DISK CARTRIDGE HAVING THE SAME

BACKGROUND OF THE INVENTION

The present invention relates to a shutter and a disk cartridge having the shutter, and particularly to a shutter supported by a case body containing a recording medium in such a manner as to be slidable for opening/closing an opening formed in the case body, and a disk cartridge having the shutter.

A known disk cartridge has a shutter supported by a case body in such a manner as to be slidable for opening/closing an opening formed in the case body. In this disk cartridge, when information is not recorded or reproduced in or from a disk-like recording medium, the shutter closes the opening for preventing permeation of dust in the case body.

Specific markings for indicating a recording allowable time to the disk-like recording medium, the kind of the disk cartridge, and the like are often provided on such a shutter.

For example, in a related art disk cartridge of this type, as shown in FIG. 4, a shutter "a" has a base member "b" and a covering layer "c" for covering the base member "b", and a printing layer "d" patterned to correspond to specific markings is provided on the surface of the covering layer "c" with ink of a ultraviolet hardening type or a solvent type.

The related art shutter "a", however, has a problem that since an expensive printing plate is used for forming the printing layer "d", so that the equipment amortization must be expedited by mass-production of the shutters "a".

In recent years, shutters have been required to be produced on a multi-kind and small-quantity basis to keep up with the market needs; however, for the above-described related art shutters "a" using the printing plate for forming markings, the kinds of markings cannot be easily altered, thereby failing to readily, flexibly keep up with the market needs.

To keep up with the market needs, there has been known a method of forming markings in a surface portion of a shutter by cutting away regions, corresponding to the markings, of the surface portion of the shutter to a depth extending to part of a base member; however, in this case, since there is no difference in hue between the marked portions to be cut away and the remaining portion not to be cut away, the visibility of the markings is degraded.

SUMMARY OF THE INVENTION

An object of the present invention is to provide a shutter capable of reducing the cost required for forming markings and improving the workability in formation of the markings, and enhancing the visibility of the markings, and to provide a disk cartridge having the shutter.

To achieve the above object, according to a first aspect of the present invention, there is provided a shutter supported by a case body containing a recording medium in such a manner as to be slidable for opening/closing an opening formed in the case body. The shutter includes at least two layers composed of a base layer and at least one covering layer formed to cover the base layer, wherein a difference in hue between the uppermost layer of the at least two layers and the underlying layer thereof is in a range of two or more in hue cycle of the PCCS (Practical Color Co-ordinate System); and markings are formed in a surface portion of the shutter by cutting away regions, corresponding to the markings, of the surface portion of the shutter to a depth extending to the bottom of the uppermost layer or to part of the underlying layer through the uppermost layer.

With this configuration, it is possible to easily form markings without the need of using any printing plate and hence to reduce the cost required for forming the markings and improve the workability in formation of the markings, and also to easily alternate the kinds of markings and hence to readily, flexibly keep up with the market demands.

Further, it is possible to form markings with good visibility.

In the above shutter, preferably, a plurality of covering layer are used as the at least one covering layer. With this configuration, it is possible to freely set a difference in hue by suitably changing pigment components contained in the covering layers, and hence to improve the degree of freedom in design, and also it is possible to protect the base layer because the cutting depth scarcely reaches the base layer.

According to a second aspect of the present invention, there is provided a disk cartridge including: a shutter supported by a case body containing a recording medium in such a manner as to be slidable for opening/closing an opening formed in the case body. The shutter includes at least two layers composed of a base layer and at least one covering layer formed to cover the base layer, wherein a difference in hue between the uppermost layer of the at least two layers and the underlying layer thereof is in a range of two or more in hue cycle of the PCCS (Practical Color Co-ordinate System); and markings are formed in a surface portion of the shutter by cutting away regions, corresponding to the markings, of the surface portion of the shutter to a depth extending to the bottom of the uppermost layer or to part of the underlying layer through the uppermost layer.

With this configuration, it is possible to easily form markings without the need of using a printing plate and hence to reduce the cost required for forming the markings and improve the workability in formation of the markings, and also to easily alternate the markings and hence to readily, flexibly keep up with the market demands.

Further, it is possible to form markings with good visibility.

In the above disk cartridge, preferably, a plurality of covering layer are used as the at least one covering layer. With this configuration, it is possible to freely set a difference in hue by suitably changing pigment components contained in the covering layers and hence to improve the degree of freedom in design, and also it is possible to protect the base layer because the cutting depth scarcely reaches the base layer.

DETAILED DESCRIPTION OF THE PREFERRED EMBODIMENTS

Hereinafter, preferred embodiments of a shutter and a disk cartridge having the shutter according to the present invention will be described with reference to the accompanying drawings.

It should be noted that in the following embodiments, the present invention is applied to a disk cartridge for recording and/or reproducing information signals in and/or from a disk-like recording medium having a diameter of about 64 mm, and a shutter used for the disk cartridge.

Figure 1:
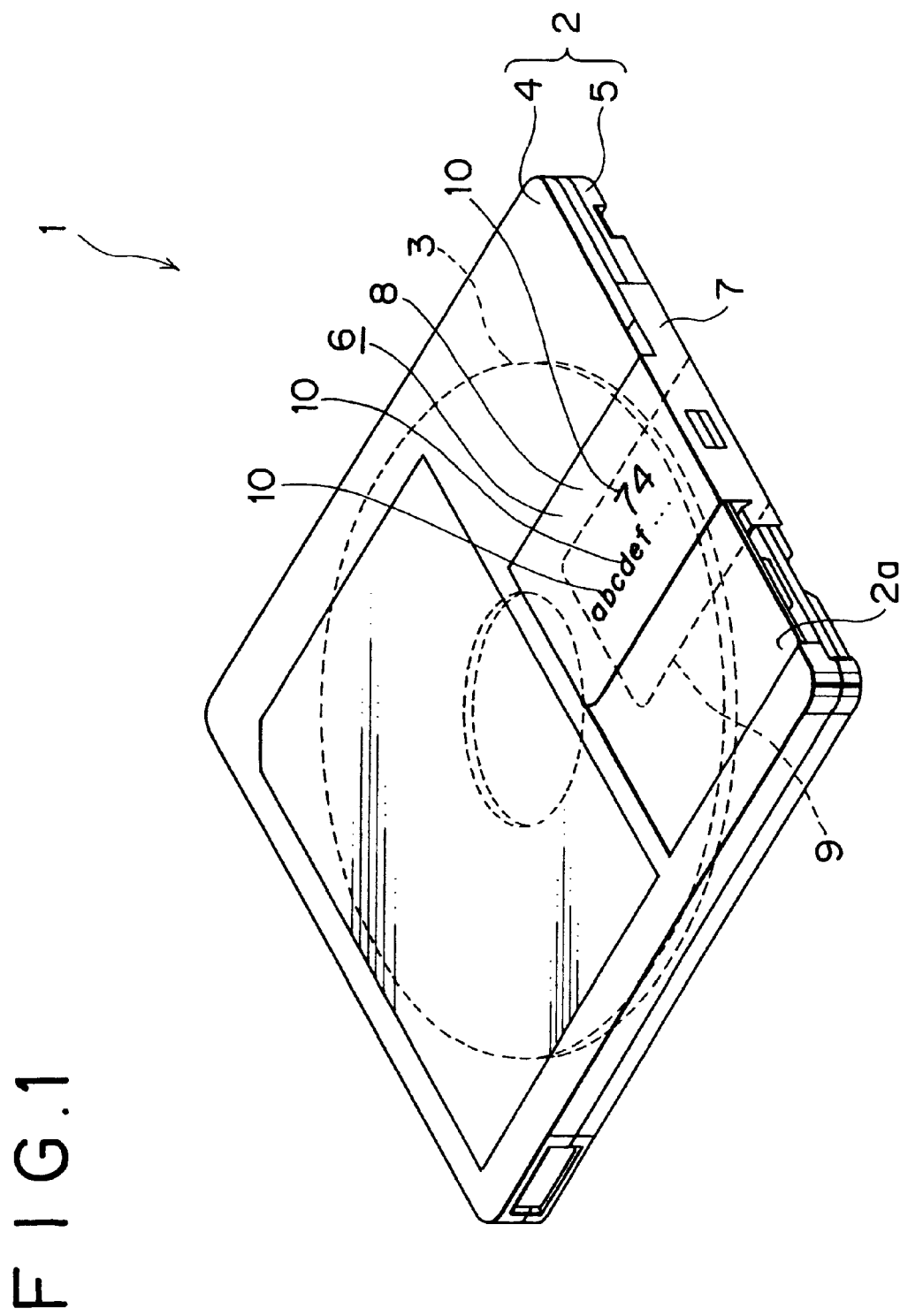
FIG. 1 is a perspective view of a disk cartridge of the present invention, which has a shutter of the present invention.

Referring to FIG. 1, there is shown a disk cartridge 1 including a flat case body 2 in which a disk-like recording medium 3 is rotatably contained.

The case body 2 includes an upper half 4 and a lower half 5 joined to each other. On one end side of the case body 2, an upper shallow supporting recess 2a is formed in a surface portion of the upper half 4, and a lower shallow supporting recess 2a is formed in a surface portion of the lower half 5. A shutter 6 is slidably supported by the case body 2. An opening (not shown), which is opened when the shutter 6 is slid in a specific direction, is formed in such a manner as to pass through a portion of the upper half 4 and the corresponding portion of the lower half 5. To be more specific, the opening is opened by sliding the shutter 6 at the time of recording or reproducing information signals in or from the disk-like recording medium 3.

The shutter 6 includes a side surface portion 7, an upper surface portion 8 projecting from the upper edge of the side surface portion 7, and a lower surface portion 9 projecting from the lower edge of the side surface portion 7 in the same direction as the projecting direction of the upper surface portion 8. These side surface portion 7, upper surface portion 8, and lower surface portion 9 are formed into one-body. The shutter 6 is supported by the case body 2 with the upper and lower surface portions 8 and 9 slidably fitted in the upper and lower supporting recesses 2a, respectively.

Figure 2:
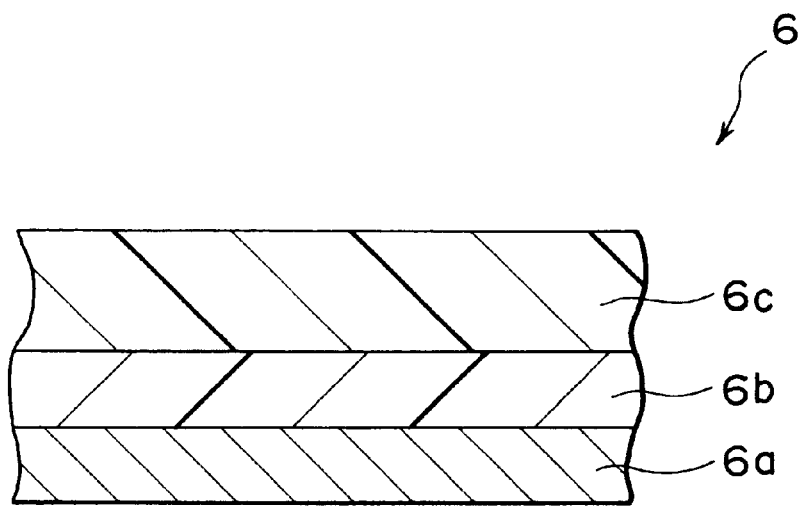
FIG. 2 is an enlarged sectional view of the shutter shown in FIG. 1, showing a state before markings are formed in a surface portion of the shutter.
Figure 3:
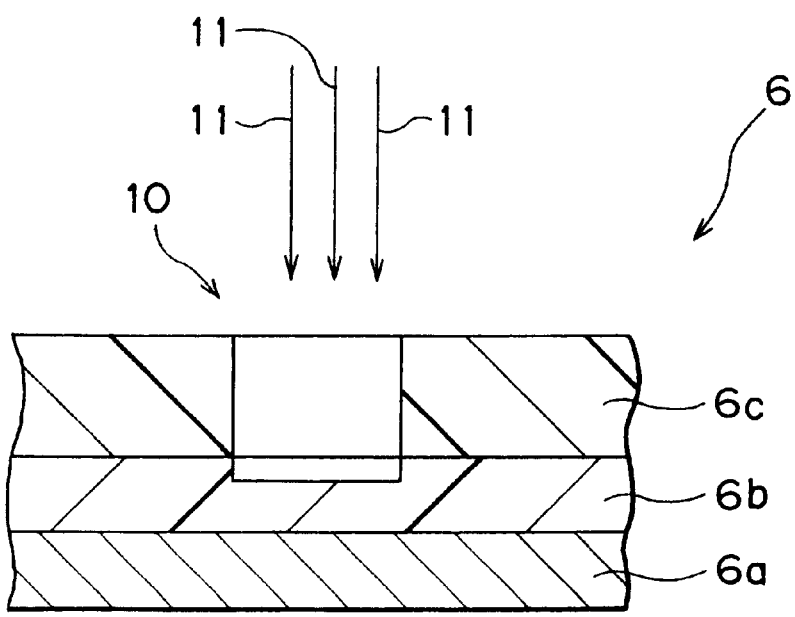
FIG. 3 is an enlarged sectional view of the shutter shown in FIG. 1, showing a state after markings are formed in a surface portion of the shutter.
Figure 4:
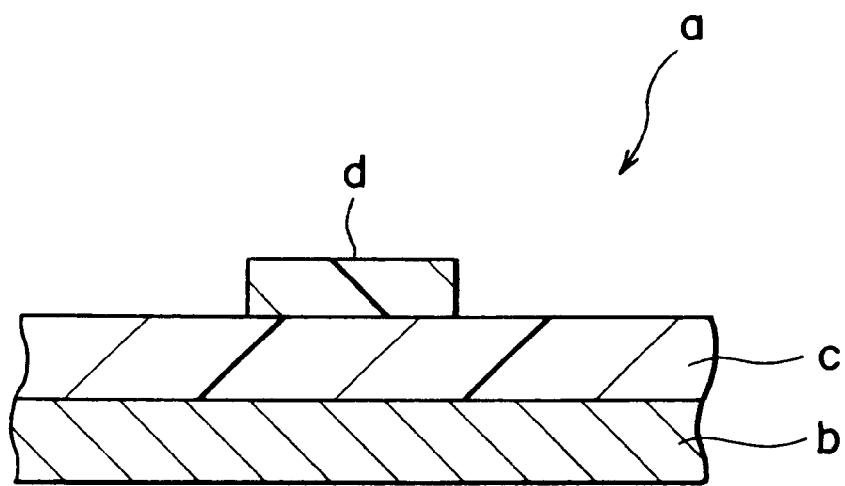
FIG. 4 is an enlarged sectional view showing a related art shutter.

Referring to FIGS. 2 and 3, the shutter 6 is of a three-layer structure composed of a base member or base layer 6a, a first covering layer 6b formed to cover the base layer 6a, and a second covering layer 6c formed to cover the first covering layer 6b. The base layer 6a is typically made from aluminum and each of the first covering layer 6b and the second covering layer 6c is typically made from polyester or an epoxy resin based resin.

In this embodiment, the thickness of the second covering layer 6c is set to be equal to or slightly larger than that of the first covering layer 6b. For example, the thickness of the first covering layer 6b is set to a value in a range of 4 to 6 $\mu$m; the thickness of the second covering layer 6c is set to a value in a range of 8 to 10 $\mu$m; and the total thickness of the first and second covering layers 6b and 6c is set to a value in a range of 12 to 16 $\mu$m. The formation of the second covering layer 6c with its thickness being equal to or slightly larger than that of the first covering layer 6b is advantageous as described below. When each of a boundary between the side surface portion 7 and the upper surface portion 8 and a boundary between the side surface portion 7 and the lower surface portion 9 is folded, the second covering layer 6c may be elongated and/or cracked at such a folded portion. According to this embodiment, however, since the second covering portion 6c has a thickness equal to or slightly larger than that of the first covering layer 6b, it is possible to suppress the occurrence of a change in hue of the second covering layer 6c at the above folded portion. This is effective to improve the external appearance of the shutter 6.

As the main feature of this embodiment, the first covering layer 6b and the second covering layer 6c contain pigments, which pigments are different so as to satisfy a requirement in which a difference in hue between the first covering layer 6b and the second covering layer 6c is in a range of 2 or more in hue circle of the PCCS (Practical Color Co-ordinate System).

Referring to FIGS. 1 and 3, markings 10 for indicating a recording allowable time to the disk-like recording medium 3, the kind of the disk cartridge 1, and the like are provided in a portion, typically, the upper surface portion 8 of the shutter 6.

The markings 10 are formed in the upper surface portion 8 of the shutter 6 by irradiating regions to be marked on the upper surface portion 8 with laser beams 11 by using a laser marker, and cutting away the regions to a depth extending to the bottom of the second covering layer 6c or to part of the first covering layer 6b through the second covering layer 6c. In the example shown in FIG. 3, the marking 10 is formed by cutting away a region to be marked to a depth extending to part of the first covering layer 6b through the second covering layer 6c. That is to say, by cutting away regions to be marked to a depth extending to the bottom of the second covering layer 6c or to part of the first covering layer 6b through the second covering layer 6c, a difference in hue between the second covering layer 6c and the first covering layer 6b is emerged at the regions, to thereby form the markings 10 at the regions thus cut away.

As described above, according to the disk cartridge 1, since the markings 10 are formed in the upper surface portion 8 of the shutter 6 by cutting away regions to be marked to a depth extending to the bottom of the second covering layer 6c or to part of the first covering layer 6b through the second covering layer 6c by using the laser marker, it is possible to easily form the markings 10 without the need of using any printing plate. This makes it possible to improve the workability and reduce the cost, and to easily alter the kinds of markings 10 and hence to readily, flexibly keep up with the market needs.

According to the disk cartridge 1, since the difference in hue between the first covering layer 6b and the second covering layer 6c is set to be in a range of two or more in hue cycle of the PCCS, it is possible to form the markings 10 with good visibility.

Further, according to the disk cartridge 1, since the markings 10 are formed in the shutter 6 having a plurality of the covering layers, it is possible to freely set the difference in hue by suitably changing the pigments contained in the first covering layer 6b and the second covering layer 6c, and hence to improve the degree of freedom in design, and also to protect the base layer 6a because the cutting depth scarcely reaches the base layer 6a.

In the above embodiment, the shutter 6 has the two covering layers formed to cover the base layer Ga; however, the present invention is not limited thereto but may be applied to a shutter having only one covering layer or three or more covering layers formed to cover the base layer 6a.

For example, in the case of forming only one covering layer, a difference in hue between the covering layer and the base layer may be set to be in a range of two or more in hue cycle of the PCCS. The markings are formed by cutting away the base layer or the covering layer and a part of the base layer.

In this way, even in the case of forming only one covering layer, it is possible to easily form markings with an improved workability at a low cost, to easily alter the kinds of markings and hence to readily, flexibly keep up with the market needs, and to form markings with good visibility.

In the case of forming three or more covering layers, a difference in hue between the uppermost layer and the underlying layer thereof may be set to be in a range of two or more in hue cycle of the PCCS, and regions to be marked may be cut away to a depth extending to the bottom of the uppermost layer or to part of the underlying layer through the uppermost layer by the laser marker.

While the preferred embodiment of the present invention has been described using the specific terms, such as the shape and structure of each component of the shutter, such description is for illustrative purposes only, and it is to be understood that changes and modifications may be made without departing from the spirit or scope of the following claims.

What is claimed is:

1. A shutter supported by a case body containing a recording medium so as to be slidable for opening and closing an opening formed in said case body, said shutter comprising:

a base layer; and first and second covering layers formed to cover said base layer, wherein each said covering layer contains a different pigment;

each said covering layer is made of one of a polyester and an epoxy resin based resin; a thickness of said first covering layer is in a range of 4 um to 6 um;

a thickness of said second covering layer is in a range of 8 um to 10 um;

a difference in hue between an uppermost layer and an underlying layer thereof is in a range of at least two in a hue cycle of a predetermined practical color co-ordinate system; and markings formed in a surface portion of said shutter by cutting away regions corresponding to said markings of said surface portion of said shutter to a depth extending to one of a bottom of said uppermost layer and to a part of said underlying layer through said uppermost layer.

2. The shutter according to claim 1, wherein said first and second covering layers have respective hues differing by at least two in said hue cycle.

3. A disk cartridge comprising:

a case body;

a shutter supported by said case body containing a recording medium in such a manner as to be slidable for opening and closing an opening formed in said case body, said shutter including a base layer and first and second covering layers formed to cover said base layer, wherein each said covering layer contains a different pigment;

each said covering layer is made of one of a polyester and an epoxy resin based resin;

a thickness of said first covering layer is in a range of 4 um to 6 um;

a thickness of said second covering layer is in a range of 8 um to 10 um;

a difference in hue between an uppermost layer and an underlying layer thereof is in a range of at least two in a hue cycle of a predetermined practical color co-ordinate system; and markings formed in a surface portion of said shutter by cutting away regions corresponding to said markings of said surface portion of said shutter to a depth extending to one of a bottom of said uppermost layer and to a part of said underlying layer through said uppermost layer.

4. The disk cartridge according to claim 3, wherein said first and second covering layers have respective hues differing by at least two in said hue cycle.

\* \* \* \* \*